April 22, 1941.  E. M. MATHIESSEN  2,239,047
PAN CLEANER BRUSH
Filed Jan. 11, 1938  2 Sheets-Sheet 1
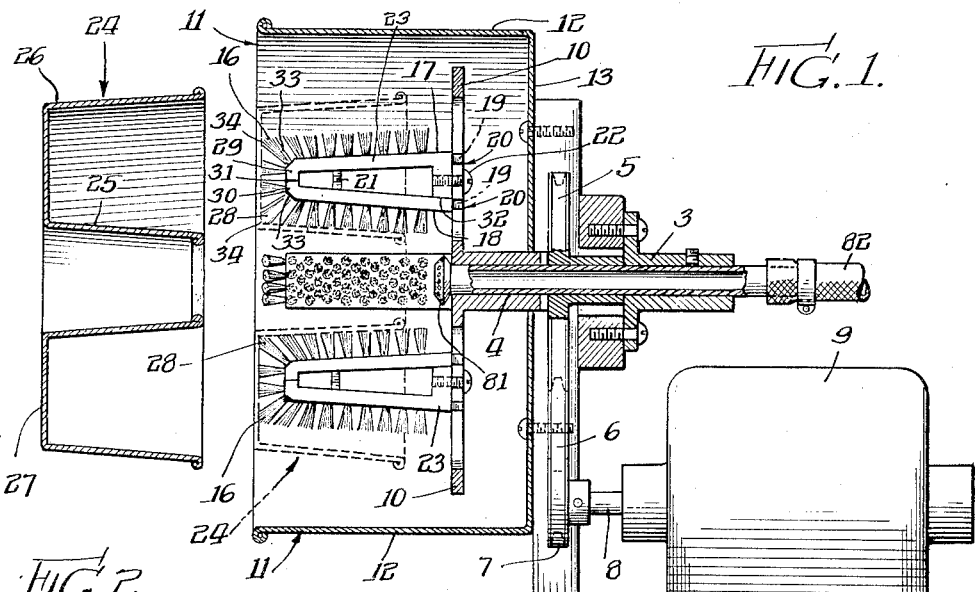
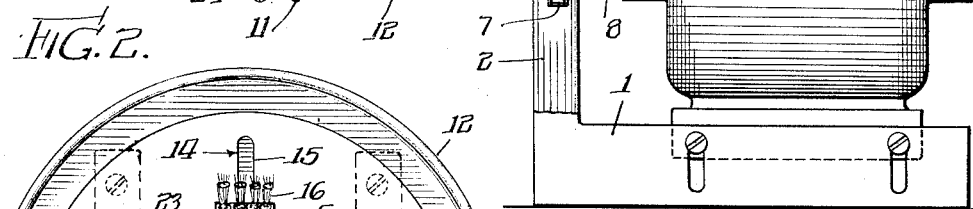
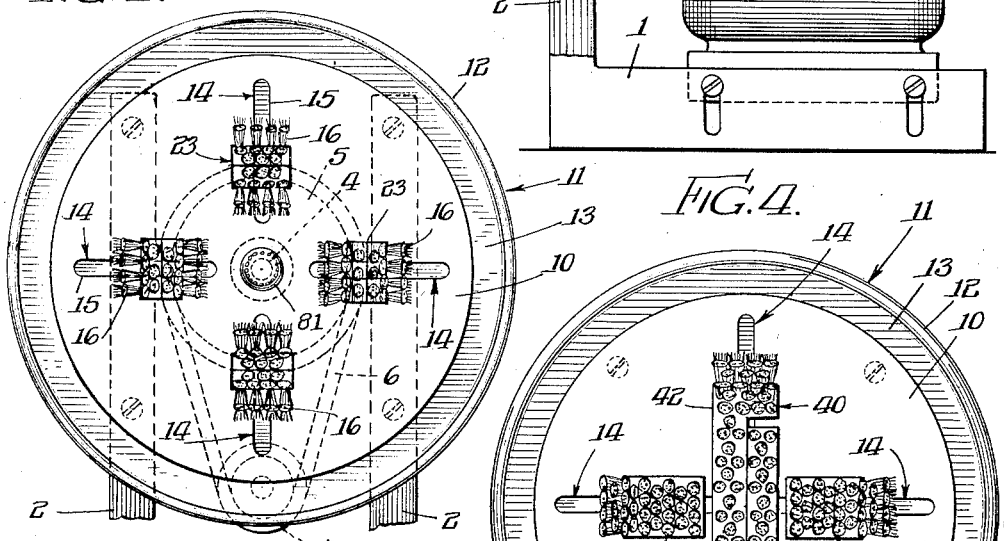
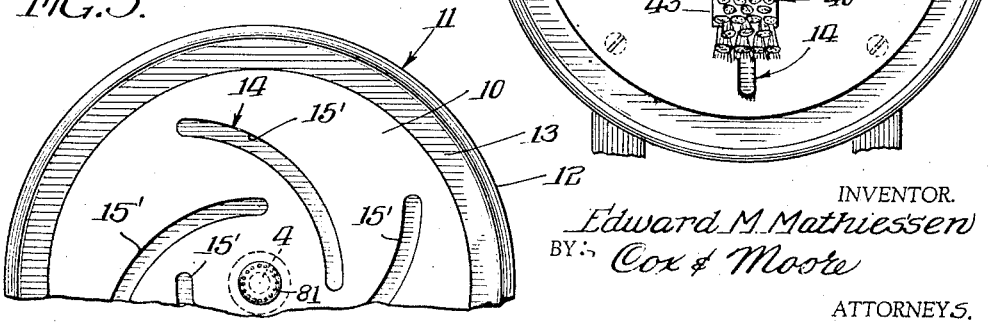
INVENTOR.
Edward M. Mathiessen
BY Cox & Moore
ATTORNEYS.

April 22, 1941.  E. M. MATHIESSEN  2,239,047
PAN CLEANER BRUSH
Filed Jan. 11, 1938  2 Sheets-Sheet 2
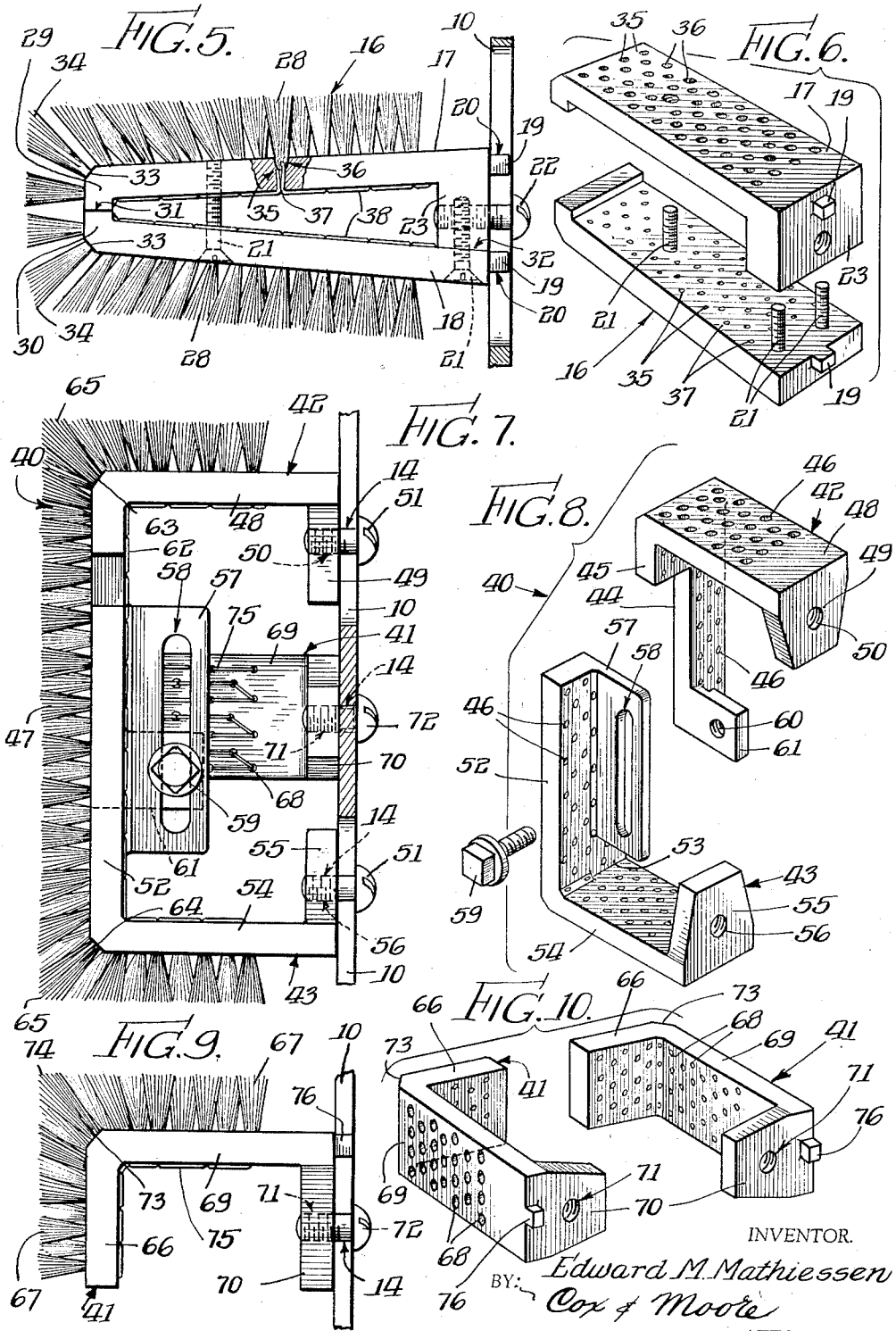
INVENTOR.
Edward M. Mathiessen
BY: Cox & Moore
ATTORNEYS.

Patented Apr. 22, 1941

2,239,047

UNITED STATES PATENT OFFICE 2,239,047

PAN CLEANER BRUSH

Edward M. Mathiessen, Chicago, Ill.

Application January 11, 1938, Serial No. 184,449

10 Claims. (Cl. 15—164)

This invention relates to cleaning devices and particularly to pan cleaning devices. More specifically the invention relates to brushes for pan cleaning apparatus.

Cake pans and pie plates, after cakes or pies, respectively, have been cooked therein or thereon, have deposits of baked substances such as fruit juices, sugar, and the like, which are exceedingly difficult to remove. Cake pans in which angel food cakes have been baked are probably the most difficult to clean because the angel food cakes contain a percentage of egg white or albumen, the albumen becoming baked and adhering to the pan with considerable tenacity. These pans or plates are usually soaked for a certain length of time and then each pan and plate is cleaned by manually scrubbing them with hand brushes, requiring the expenditure of considerable labor and time.

The present invention considerably simplifies the cleaning of cake pans, and the primary object of the invention is to provide an improved power driven device including a plurality of outwardly extending new and improved brushes so that the pans or plates may be manually placed into contact with the brushes so that all parts of the pan become thoroughly cleaned, and all baked deposits thereon are removed.

A further object of the invention is the construction of an arrangement of a plurality of brushes, constructed in a certain manner and arranged in a particular position so that the brush tufts will engage the various parts of the pan or plate to be cleaned and thereby materially reduce the amount of labor and time in cleaning the pans.

A further object of the invention is the provision of a pan cleaning element consisting of a rotary member having brushes of an improved construction, which brushes are adjustably mounted to accommodate pans of various shapes and sizes, also the arrangement of brushes which are adjustable themselves as well as being adjustable on their mounting, so that brushes of various forms and shapes assuming different positions may be had whereby many types of pans and plates can be cleaned.

A still further object of the invention is the provision of brush elements so constructed that the tufts extend at certain different positions with respect to the brush body, whereby tufts will be in position to engage the corners, edges and crevices of the pan to be cleaned so that a pan or plate will be thoroughly cleaned with the minimum amount of effort and without applying subsequent hand cleaning.

Numerous other objects and advantages will be apparent throughout the progress of the following specification.

The accompanying drawings illustrate a selected embodiment of the invention and the views therein are as follows:

Fig. 1 is a detail vertical sectional view of the improved pan and plate cleaner, the view showing a pan being inserted into the device for cleaning purposes;

Fig. 2 is a front plan view of the device shown in Fig. 1;

Fig. 3 is a view similar to Fig. 2 showing a different type of slot formation for adjusting the position of the brushes, the brushes being not shown;

Fig. 4 is a view similar to Fig. 2, but showing a different arrangement of brushes;

Fig. 5 is a detail elevation of one form of brush, being the type of brush used principally for cake pans having a central, hollow, projecting, conical-shaped member;

Fig. 6 shows the brush backs or supports of the brush element shown in Fig. 5;

Fig. 7 is a detail elevation of a form of brush for cleaning flat pans or pie plates;

Fig. 8 is a detail perspective view of the parts comprising the adjustable brush shown in Fig. 7 without the tufts being applied thereto;

Fig. 9 is a detail elevation of another form of brush for cleaning flat pans or pie plates; and Fig. 10 is a detail perspective view of the parts comprising the brush shown in Fig. 9 without the tufts being applied thereto.

The particular pan or plate cleaner herein shown for the purpose of illustrating the invention comprises a base 1 having one or more vertical standards 2 which may be either separately attached to the base 1 or integrally made therewith. The standards 2 support and carry a suitable bushing 3 which supports a tube or pipe 4. The tube 4 has a pulley 5 rotatable thereon, the pulley 5 being driven by a belt 6 from the motor pulley 7. The motor pulley 7 is fixed to the shaft 8 or a motor 9, which is suitably supported by the base 1. Instead of employing the belt and pulley construction just described, any other suitable driving construction may be employed, such as gearing or chain and sprocket mechanism.

A disk or plate member 10 is journaled on the tube 4 for rotation and driven by the pulley 5 by means of interconnecting teeth means not shown in detail and a suitable circular housing 11 may be employed to surround the disk or plate 10. The housing construction 11 may constitute a peripheral wall 12 and a bottom or base 13 and it is desirable that the base 13 of the housing be fixed to the standards 2 so as to render the housing immovable. However, if for some purpose or other it is desirable to have the housing 11 also rotate, it can be fixed to a part of the pulley 5 or plate 10. The plate or disk 10 may be provided with suitable guides or guideways 14 which may be straight slots 15, as shown in Fig. 2, or curved slots 15', as shown in Fig. 3, whereby brushes 16 may be adjustably fastened to the disk or base plate 10.

The brushes 16 are each made in two sections 17 and 18, each section having lugs 19 received in a guide 14 provided in the disk, Fig. 1. A screw 21 passes through the body of the sections 17 and 18 and locks the two sections together. A screw 22 passes through the slot 15 or 15' in the plate or disk 10 and threadedly engages the base portion 23 of the brush section 17 and holds the assembled brush in fixed position. The brushes 16, therefore, are adjustable and may be shifted inwardly and outwardly along the slots 15 and 15' so as to make the brushes adaptable for pans of various sizes. The brushes 16 are preferably employed for cleaning cake pans 24, Fig. 1, of the type used in baking angel food or sponge cakes. These pans 24 usually have an outwardly extending, hollow, conically shaped member 25 concentrically arranged with respect to the outwardly sloping peripheral wall 26, there being a bottom 27 forming the bottom of the cake pan.

The brushes 16 are so arranged and constructed that the outer edges of the brush tufts 28 of at least two brushes will engage the inner cone wall 25 and the inside walls of the bottom 27 and the side walls 26, respectively, of the pan 24.

Angel food cake pans 24 are of various sizes and, therefore, the brushes 16 are preferably constructed so that the outer edges of the tufts 28 will strike the sides of the surfaces 25, 26 and 27 of the smallest commercial size pan. In pans of larger size one or more of the brushes 16 may be positioned so as to engage the walls of the cone 25 and a part of the bottom, the other brushes being spaced farther away from the center so as to engage the inside of the peripheral walls 26 as well as the remaining portion of the bottom 27, whereby all sides and bottom of the pan will be engaged by the brush whether the pan be of the smallest commercial size or the largest commercial size.

The sections 17 and 18 of the brushes 16 are inclined, that is, when both of the sections are put together, as shown in Fig. 1, they tend to taper inwardly, to the left in Fig. 1, and the brush tufts are cut or trimmed so as to be relatively parallel with the outer surface of the sections 17 and 18 to which they are fastened. The brush tufts are made usually to the general configuration of the slanting walls 25 and 26 of the pan. The bottom portions 29 and 30 of the brush sections 17 and 18 extend inwardly, as shown in Fig. 1, and are adapted to engage each other as indicated at 31. The section 17 is provided with a projection or lug 23 which engages the section 18 as indicated at 32. The corners of the sections 17 and 18 are beveled as indicated at 33. The bevel is substantially at a forty-five degree angle with respect to the bottom edges of the portions 29 and 30. These bevel sections 33 are sufficiently large to accommodate tufts, and these latter tufts are trimmed with substantially angular corners 34 conforming with the angle of the walls 25 and 26 with respect to the bottom 27 of the pan. The tufts on the bottom are relatively straight so as to engage the bottom 27. The sections 17 and 18 of the brushes 16 are preferably made of metal and have a plurality of holes 35, Fig. 6, extending therethrough, the holes each being of two diameters 36 and 37, the larger diameter receiving the tufts and forming a seat therefor, while the smaller diameter permits a wire 38 to be passed therethrough to fasten the tufts in their respective sockets 35 in the sections. In order to lock the two sections 17 and 18 together more firmly, additional screws 21 may be provided but these latter screws pass through the section 18 and threadedly engage the thickened portion or projection 23 on the section 17.

The brushes, therefore, are constructed and adjustably positioned so as to engage all the inside walls of a pan having a central tube, such as is ordinarily used for angel food cake, regardless of the size of the cake pan. It is preferable that the brushes 16 and the inside edges of the slots 15 and 15' be such as to accommodate the smallest commercial size pan. Where, however, larger pans are to be cleaned, a pair of the brushes 16 may be slid outwardly away from the center so that the tufts will engage the inside of the exterior wall as well as the inside of the bottom. Therefore, when a pan 24 is put in position to be cleaned, as shown in Fig. 1, the revolving disk 10 will cause the interior surfaces of the pan to be engaged by the brush tufts and, therefore, be cleaned. It is preferable that the pans be soaked a predetermined time before they are put in cleaning position so that the baked substance will become soft to permit them to be readily cleaned.

For cleaning flat cake pans, such as layer cake pans or pie plates, brushes 40 and 41, as shown in Figs. 4 and 7 to 10, inclusive, may be employed. These brushes are basically constructed similarly to the brushes 16 but are necessarily of different shape and arrangement.

The brush 40, Figs. 4, 7 and 8, comprises two brush elements 42 and 43 which are adjusted longitudinally and connected together so as to accommodate pans of various sizes. The brushes 41 are preferably made into single elements and are adjustable toward and away from the center so as to clean pans of various diameters. The brush 40 is arranged so that the tufts on the bottom and the ends engage the bottom and inside peripheral edges of the pan, so that the entire inside edges and bottom of the pan will be completely contacted and engaged by the tufts. The brushes 40 are preferably moved outward, that is, away from their center toward the edge so that the tufts on the edge will engage the inside peripheral edge of the pan, while the bottom tufts on the brush 41 will engage the bottom of the pan.

The brush 40, comprising the elements 42 and 43 each of which is relatively L-shaped in bottom plan, as clearly shown in Fig. 4, is adapted to be adjustably connected so as to permit longitudinal adjustment. The brush element 42 of the brush 40 comprises an arm 44 with an outwardly extending projection 45. The elements 44 and 45 are provided with openings 46 similar to the openings 35, 36, 37 described in connection with the brushes 16. These openings 46 are adapted to receive tufts 47 which are similar to the tufts 28 previously described. The section 42 also has a right angle extension 48 which is integral with the projection 45 and is adapted to receive tufts 47 which will engage the inside peripheral edge of the pan. A down-turned lug 49 extends inwardly from the portion 42 and is provided with a hole or opening 50 to receive a screw or other fastening element 51, Fig. 7, for adjustably securing the element 42 to the rotating disk 10.

The section 43 of the brush 40 is provided with a straight flat portion 52 which is similar to the portion 44 of the element 42. An extension 53, similar to the previously described section 45, is integrally connected to the portion 52 and forms a relatively L-shaped portion which is adapted to contact the similar portions of the element 42, so that when the two elements are placed together, they will form a relatively rectangular brush 40 as shown in Fig. 4. However, due to the adjustability, the brush elements 42 and 43 may be spread apart to accommodate larger sized pans. The brush element 43 has a right angle extension 54 which is similar to the previously described section 48. The element 43 is also provided with tuft receiving openings 46 for receiving tufts 47. The tufts on the portion 52 of the element 43 are adapted to engage the bottom of the pan while the tufts on the extension 54 are adapted to engage the inside peripheral edge of the pan. The element 43 is provided with an extending lug or flange 55, which is similar to the previously described flange 49, being provided with a hole 56 to receive a screw 51 for adjustably fastening the element 43 to the rotating disk 10.

The element 43 is provided with an upstanding bracket 57 having an elongated slot 58 provided therein for the reception of a locking screw 59. The locking screw 59 is passed through the slot 58 and through a hole 60 provided in the bracket 61 of the member 42. This locking element may comprise a screw co-operating with a nut or the opening 60 may be interiorly threaded for threadedly receiving the screw 59. Therefore, the brush 40 comprising the elements 42 and 43 may be locked together and adjusted longitudinally so that the brush 40 will accommodate pans or plates of various diameters. The tufts 47 are fastened in position in their openings 46 by means of wires 62, the wires 62 being similar to the wires 38 previously described in connection with the brush 16. Elements 42 and 43, where the portions 48 and 54 extend angularly therefrom, are provided with bevels 63 and 64, respectively, there being a tuft extending outwardly from each of these points, and these tufts are provided with right angle corners 65 so as to engage the corners of the pan where the peripheral edge engages the bottom. All the tufts are trimmed so that the outline of the brush 40, whether extended or not, forms relatively straight connecting sides, as clearly shown in Fig. 7.

A brush 41 is adapted to be placed on each side of the brush 40, as clearly shown in Fig. 4, and these brushes are also adjustable in the guideways 14. Each brush 41 comprises an arm 66 to receive tufts 67 like the tufts 47 and 28, being received in openings 68 like the previously described openings 46 and 35. Each arm 66 is rigid with another arm 69 also carrying tufts 67. A fastening lug 70 extends inwardly from the arm 69 and is provided with an opening 71 to receive a screw 72 for adjustably securing the brushes to the disk 10. Each brush 41 is provided with a bevel 73 from which a tuft 67 extends, being trimmed at 74 to provide a right angle edge alining with the straight trimmed edges of the tufts 67 on the arms 66 and 69. The tufts are fastened in position into their sockets 68 by wires 75. The brushes 41 may also have lugs 76 formed thereon to be received in the guides 14 to prevent any tendency of the brushes pivoting about the screws 72 when the brushes are locked in adjusted position. The brushes 41, therefore, may be used in connection with the brush 40, the brushes 41 being adjusted so that the bristles on their outer peripheral edge will be the same distance from the center of the disk 10 as the outer peripheral tufts on the brush 40. The brushes 40 and 41 are preferably used in flat pans, that is, pans having a straight bottom and an outer peripheral edge, while the brushes 16 are preferably used with the type of pan having a central spout as indicated at 24, Fig. 1.

It has been found desirable to subject the pans during the cleaning operation to a spray of water and therefore the tube or pipe 4 is preferably connected to a source of washing liquid under pressure, as shown in Fig. 1. Accordingly the pipe or tube 4 extends completely through the bushing 3 and the pulley and rotating head and terminates at its inner end in a spray nozzle 81. The pipe 4 is supplied with water from a hose connection 82 leading to a suitable source of supply, such as hot or cold water, or both. In accordance with the present construction, therefore, the pipe or tube 4 does not rotate, being rigid with the bushing 3 and serving as a support for the rotatable parts adapted to rotate thereabout.

The cleaner herein disclosed is provided with brushes which are adapted to clean various types of pans and these brushes are adjustable to accommodate pans of various diameters. The brushes are so constructed and arranged that all the interior surfaces of a pan may be completely contacted to insure proper cleaning. The tufts of the brushes are relatively stiff and positively remove any foreign substance from the pan during the cleaning operation. The brushes 16 may also be rotated if desired. While the shape of the brushes herein described has been found practical for the type of pans herein described, many other types of pans may be also cleaned by merely changing the shape of the brushes. The brush cleaner has been found inexpensive to construct and positively cleans pans with great rapidity.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A brush for a pan cleaner adapted for attachment to a rotatable face plate comprising two relatively extensible sections, each section comprising an attachment flange for attachment to the face plate, an arm extending outwardly from each flange, said outwardly extending arms terminating in lateral arms projecting toward the opposite section and overlapping, said arms being tufted, inwardly projecting lug means formed on the inner portions of each of said lateral arms in opposed relationship, one of said lug means having a laterally elongated slot and the other comprising clamping means engageable with the slot to clamp the sections in any of a plurality of relatively extended positions.

2. A brush construction for pan cleaners and the like comprising a pair of spaced, elongated members adapted to receive brush tufts, said elongated members being provided with abutment means adjacent one extremity, one of said elongated members only having a laterally disposed abutment flange adjacent the opposite extremity, fastening means clampingly joining said elongated members together with said terminal abutment means in abutting relationship, and means for mounting said brush construction upon a rotatable plate in pan cleaning relationship, said last-named means comprising slot means in said plate, said slot being of relatively limited transverse extent to permit said laterally extending flange to reside flatwise against one surface of said plate, fastening means adapted to extend through said slot and engage said laterally extending abutment flange and lug means complementarily receivable within said slot and extending in substantially the same direction as said fastening means for positively fixing said brush means in the plane of said plate, said lug means comprising a lug associated with the adjacent extremities of the elongated brush members, both lug means being adapted for co-incidental disposal within said slot.

3. A brush for attachment to a face plate of a pan cleaner comprising a pair of brush sections, each section having an outwardly extending arm, said outwardly extending arms terminating in laterally projecting arms projecting toward each other and terminating in contacting abutment faces, said arms carrying tufts, the inner end of one of said outwardly extending arms terminating in a flange extending laterally toward the other arm and having an inwardly facing flat surface for attachment to the face plate, said flange terminating at its outer extremity in an abutment surface arranged in abutting relation to the surface of the opposite section, and clamping means extending between said sections and clamping said abutment surfaces fixedly in contacting relation to provide a brush assembly.

4. A brush construction as defined in claim 3 including a fastener extending through said lateral flange for clamping said inwardly facing flange surface against the face plate.

5. A brush construction as defined in claim 3, having fastener means in said laterally extending flange for attachment to a slot in the face plate and a lug projecting inwardly from said inwardly facing flat surface at a point spaced from said fastener means and receivable within said slot to rotationally fix the brush on the face plate when the fastener is applied through said slot.

6. A brush construction as defined in claim 3 having fastener means in said laterally extending flange for attachment to a slot in the face plate and a lug projecting inwardly from said inwardly facing flat surface at a point spaced from said fastener means and receivable within said slot to rotationally fix the brush on the face plate when the fastener is applied through said slot, said lug being of relatively narrow width with respect to the width of said flange.

7. A brush for attachment to the face plate of a pan cleaner comprising an outwardly extending arm terminating in a laterally extending arm adjacent the outer extremity thereof, said arms carrying tufts, the inner extremity of said outwardly extending arm terminating in a laterally extending flange having an inwardly facing flat surface for attachment to the face plate, means associated with said flange for clamping said inwardly facing flat surface rigidly against said face plate and an inwardly projecting lug of relatively narrow width formed on said inwardly facing flat surface at a point spaced from said clamping means and receivable within said face plate to rotationally position the brush on the face plate when said clamping means is applied.

8. A brush for attachment to the face plate of a pan cleaner comprising an outwardly extending arm terminating in a laterally extending arm adjacent the outer extremity thereof, said arms carrying tufts, the inner extremity of said outwardly extending arm terminating in a laterally extending flange having an inwardly facing flat surface for attachment to the face plate, said flange having a fastener receiving aperture for receiving a clamping fastener adapted to extend through the face plate to clamp the said inwardly facing flat surface thereagainst, and a lug extending inwardly from said surface at a point spaced from said aperture, said lug being of substantially no greater width than said aperture and being adapted to be received within a fastener slot in the face plate for rotationally fixing said brush in position.

9. A pan cleaner having in combination a radially slotted face plate, a brush for attachment to the said face plate comprising an outwardly extending arm terminating in a laterally extending arm adjacent the outer extremity thereof, said arms carrying tufts, the inner extremity of said outwardly extending arm terminating in a laterally extending flange having an inwardly facing flat surface for attachment to the face plate, fastener means extending through said slot and said flange for clamping said inwardly facing flat surface of the brush against said face plate, and a lug extending inwardly from said inwardly facing flat surface at a point spaced from said fastener and received within a spaced portion of said slot for rotationally fixing the brush with respect to the face plate.

10. A head construction for a pan cleaner comprising a brush member adapted for attachment to a rotatable face plate comprising two brush sections, each section comprising an attachment flange for attachment to the face plate, an arm extending outwardly from said face plate, said outwardly extending arms terminating in lateral arms projecting toward the opposite sections and clamping means for holding the arms in any adjusted position, a second pair of brush sections annularly disposed on said plate and comprising attachment flange portions secured to the face plate in relatively diametrically opposed relation at a position substantially ninety degrees removed from said first sections, arms extending outwardly from said attachment portions, a pair of radially extending arms projecting toward the said lateral arms of said first named brush providing radially extending outer faces supporting axially extending pan cleaning tuft means but terminating a substantial distance short thereof whereby said brush sections are all radially adjustable in accordance with the dimensions of the pan to be cleaned.

EDWARD M. MATHIESSEN.